United States Patent
Suzuki

(10) Patent No.: US 6,831,687 B1
(45) Date of Patent: Dec. 14, 2004

(54) DIGITAL CAMERA AND IMAGE SIGNAL PROCESSING APPARATUS

(75) Inventor: Masahiro Suzuki, Inzai (JP)

(73) Assignee: Nikon Corporation, Tokyo (JP)

( * ) Notice: Subject to any disclaimer, the term of this patent is extended or adjusted under 35 U.S.C. 154(b) by 695 days.

(21) Appl. No.: 09/618,272

(22) Filed: Jul. 18, 2000

(30) Foreign Application Priority Data

Jul. 21, 1999 (JP) .......................................... 11-206140

(51) Int. Cl.[7] .............................................. H04N 9/64
(52) U.S. Cl. ............... 348/251; 348/207.99; 348/222.1; 348/229.1; 348/241; 348/251; 348/335
(58) Field of Search ................................. 348/241, 251, 348/207.99, 335, 229.1, 224.1, 222.1

(56) References Cited

U.S. PATENT DOCUMENTS 5,434,902 A * 7/1995 Bruijns ....................... 378/98.7
5,784,100 A * 7/1998 Konishi ....................... 348/251
2003/0052987 A1 * 3/2003 Li et al. ...................... 348/335

FOREIGN PATENT DOCUMENTS

JP            405083622 A * 4/1993 .......... H04N/5/235

* cited by examiner

Primary Examiner—Andrew Christensen
Assistant Examiner—Brian Genco
(74) Attorney, Agent, or Firm—Oliff & Berridge PLC

(57) ABSTRACT

A digital camera includes: an image-capturing device which captures an image of a photographic subject which passes through a photographic lens, and outputs image data; a gain adjustment section which performs gain adjustment by multiplying the image data output from the image-capturing device by a predetermined gain; a detection section which detects an optical axis of the photographic lens upon the image-capturing device; and a gain adjustment coefficient calculation section which calculates a gain adjustment coefficient according to distance between a position of a part of the image on the image-capturing device and the optical axis, and the gain adjustment section performs gain adjustment of image data corresponding to the position of the part of the image on the image-capturing device using the gain adjustment coefficient.

15 Claims, 14 Drawing Sheets

FIG. 4

|   | 1 | 2 | 3 | 4 | 5 | 6 | 7 | 8 | 9 | 10 | 11 | 12 | 13 | 14 | 15 | 16 | 17 | 18 |   |
|---|---|---|---|---|---|---|---|---|---|----|----|----|----|----|----|----|----|----|---|
| 1 | R | G | R | G | R | G | R | G | R | G  | R  | G  | R  | G  | R  | G  | R  | G  | ·· |
| 2 | G | B | G | B | G | B | G | B | G | B  | G  | B  | G  | B  | G  | B  | G  | B  | ·· |
| 3 | R | G | R | G | R | G | R | G | R | G  | R  | G  | R  | G  | R  | G  | R  | G  | ·· |
| 4 | G | B | G | B | G | B | G | B | G | B  | G  | B  | G  | B  | G  | B  | G  | B  | ·· |
| 5 | R | G | R | G | R | G | R | G | R | G  | R  | G  | R  | G  | R  | G  | R  | G  | ·· |
| 6 | G | B | G | B | G | B | G | B | G | B  | G  | B  | G  | B  | G  | B  | G  | B  | ·· |
| 7 | R | G | R | G | R | G | R | G | R | G  | R  | G  | R  | G  | R  | G  | R  | G  | ·· |
| 8 | G | B | G | B | G | B | G | B | G | B  | G  | B  | G  | B  | G  | B  | G  | B  | ·· |
| 9 | R | G | R | G | R | G | R | G | R | G  | R  | G  | R  | G  | R  | G  | R  | G  | ·· |
| 10| G | B | G | B | G | B | G | B | G | B  | G  | B  | G  | B  | G  | B  | G  | B  | ·· |

DIGITAL CAMERA AND IMAGE SIGNAL PROCESSING APPARATUS

INCORPORATION BY REFERENCE

The disclosure of the following priority application is herein incorporated by reference: Japanese Patent Application No. 11-206140 filed Jul. 21, 1999.

BACKGROUND OF THE INVENTION

1. Field of the Invention

The present invention relates to a digital camera and to an image signal processing apparatus in which an image of a photographic subject is stored as electronically compressed image data.

2. Description of the Related Art

A known type of digital camera comprises an image-capturing device such as a CCD which captures an image of a photographic subject via a photographic lens and outputs image data, and an image processing circuit which performs image processing, such as for example white balance adjustment or gamma correction, by adjusting the gain for the image data output from the image-capturing device. In the image processing circuit image processing is performed by calculating parameters such as the R-gain and/or the B-gain for the white balance adjustment, or the gradation curve for the gamma correction or the like, according to a previously determined algorithm, based upon the image data output from the image-capturing device.

With the above described digital camera, a white cap is fitted upon the photographic lens or an image is captured of a photographic subject which has uniform white brightness, a white balance adjustment coefficient is calculated based upon the image data output from a predetermined region of the CCD, and white balance adjustment is performed for the image data from all of the regions of the CCD using this adjustment coefficient which has been calculated. Generally the light gathering rate for the CCD is reduced, since a large number of pixels (picture elements) are gathered in a specified area in order to increase the number of pixels, and therefore the area of the CCD for one pixel becomes small. In this connection, in order to increase the light gathering rate of the CCD, on chip micro lenses are formed upon the CCD.

With this type of CCD, the strength of the R, G, and B components of the light which is received by the photodiodes via the on chip lenses changes according to the angle of the light which is incident upon the on chip lenses. Accordingly, with a digital camera which photoelectrically converts light which passes through a photographic lens and is directed to a CCD, when the angle of incidence of the light upon the on chip lenses on the CCD changes due to change of the position of the pupil of the photographic lens, change of the aperture value, or change of the relative positions of the optical axis of the photographic lens and the CCD, it is easy for the strengths of the R, G, and B components of the light received by the photodiodes to change and for the white balance color adjustment to become improperly adjusted, and there is a danger that color loss and color fogged images may occur. In particular, a problem can easily occur with a digital camera of the high picture quality type in which the number of pixels can exceed 200,000.

SUMMARY OF THE INVENTION

The objective of the present invention is to propose a digital camera which is capable of sufficiently suppressing the phenomena of color loss and color fog by correcting changes in the output values of image data of the CCD generated by changes of the relative positions of the optical axis of the photographic lens and an image-capturing device such as a CCD or the like, and changes of the position of the pupil and the aperture value of the photographic lens, and to propose an image signal processing apparatus which is capable of this type of image processing.

In order to attain the above objective, a digital camera according to the present invention comprises: an image-capturing device which captures an image of a photographic subject which passes through a photographic lens, and outputs image data; a gain adjustment section which performs gain adjustment by multiplying the image data output from the image-capturing device by a predetermined gain; a detection section which detects an optical axis of the photographic lens upon the image-capturing device; and a gain adjustment coefficient calculation section which calculates a gain adjustment coefficient according to distance between a position of a part of the image on the image-capturing device and the optical axis, and the gain adjustment section performs gain adjustment of image data corresponding to the position of the part of the image on the image-capturing device using the gain adjustment coefficient.

In this digital camera, it is preferred that the gain adjustment coefficient is a function of distance between the position of the part of the image and the optical axis.

Also, it is preferred that a color filter provided upon the image-capturing device is further provided and the gain adjustment coefficient calculation section calculates a gain adjustment coefficient for each color for image data which have been captured via the color filter.

Also, it is preferred that the gain adjustment coefficient is a coefficient which compensates for reduction of light intensity based upon a cosine fourth power law for the photographic lens.

Also, it is preferred that the image-capturing device comprises a plurality of pixels; an on chip lens which increases light gathering rate is formed upon each of the plurality of pixels; and the gain adjustment coefficient is a coefficient which compensates for reduction of transmitted light intensity due to the on chip lens.

Also, it is preferred that the image-capturing device comprises a plurality of pixels; anon chip lens which increases light gathering rate is formed upon each of the plurality of pixels; and the gain adjustment coefficient is a coefficient which compensates for reduction of light intensity based upon a cosine fourth power law for the photographic lens, and for reduction of transmitted light intensity due to the on chip lens.

Another digital camera according to the present invention comprises: an image-capturing device which captures an image of a photographic subject which passes through a photographic lens, and outputs image data; a gain adjustment section which performs gain adjustment by multiplying the image data output from the image-capturing device by a predetermined gain; a detection section which detects an optical axis of the photographic lens upon the image-capturing device; and a gain adjustment coefficient calculation section which calculates a gain adjustment coefficient according to distance between a position of a part of the image on the image-capturing device and the optical axis, and lens photographic conditions of the photographic lens including at least one of pupil position and aperture value, and the gain adjustment section performs gain adjustment of image data corresponding to the position of the part of the image on the image-capturing device using the gain adjustment coefficient.

In this digital camera, it is preferred that the gain adjustment coefficient is a function of distance between the position of the part of the image and the optical axis.

Also, it is preferred that a color filter provided upon the image-capturing device is further provided, and the gain adjustment coefficient calculation section calculates a gain adjustment coefficient for each color for image data which have been captured via the color filter.

On a recording medium according to the present invention a program for image signal processing is recorded. The program comprises: a detection process in which an optical axis of a photographic lens located on an image-capturing device is detected in image data obtained by the image-capturing device; a gain adjustment coefficient calculation process in which a gain adjustment coefficient is calculated according to distance between an image position on the image-capturing device and the optical axis; and a gain adjustment process in which gain adjustment of image data corresponding to the image position on the image-capturing device using the gain adjustment coefficient.

In this recording medium, it is preferred that in the gain adjustment coefficient calculation process, a gain adjustment coefficient is calculated according to distance between an image position on the image-capturing device and the optical axis, and lens photographic conditions of the photographic lens including at least one of pupil position and aperture value.

A data signal according to the present invention transmitted via a communication line comprises a program for image signal processing. The program comprises: a detection process in which an optical axis of a photographic lens located on an image-capturing device is detected in image data obtained by the image-capturing device; a gain adjustment coefficient calculation process in which a gain adjustment coefficient is calculated according to distance between an image position on the image-capturing device and the optical axis; and a gain adjustment process in which gain adjustment of image data corresponding to the image position on the image-capturing device using the gain adjustment coefficient.

In this data signal, it is preferred that in the gain adjustment coefficient calculation process, a gain adjustment coefficient is calculated according to distance between an image position on the image-capturing device and the optical axis, and lens photographic conditions of the photographic lens including at least one of pupil position and aperture value.

An image signal processing apparatus according to the present invention that processes image data output by an image-capturing device, on which a plurality of pixels are arranged in two dimensions, and which captures an image of a photographic subject which has passed through a photographic lens, comprises: a gain adjustment coefficient calculation section that calculates a coefficient for adjusting a gain for each of the pixels according to distance between a pixel corresponding to a position of an optical axis of the photographic lens and each of the pixels; and a gain adjustment section which adjusts a gain for image data of each of the pixels by multiplying a predetermined gain by the coefficient.

In this image signal processing apparatus, it is preferred that the image data output by the image-capturing device includes data related to lens photographic conditions of the photographic lens including at least one of pupil position and aperture value; and the gain adjustment coefficient calculation section calculates a coefficient for adjusting a gain for each of the pixels according to distance between the pixel corresponding to the position of the optical axis and each of the pixels, and the data related to lens photographic conditions of the photographic lens including at least one of pupil position and aperture value.

BRIEF DESCRIPTION OF THE DRAWINGS

FIG. 4 is a figure showing an arrangement of color filters provided in a CCD.

DESCRIPTION OF THE PREFERRED EMBODIMENT

Figure 1:
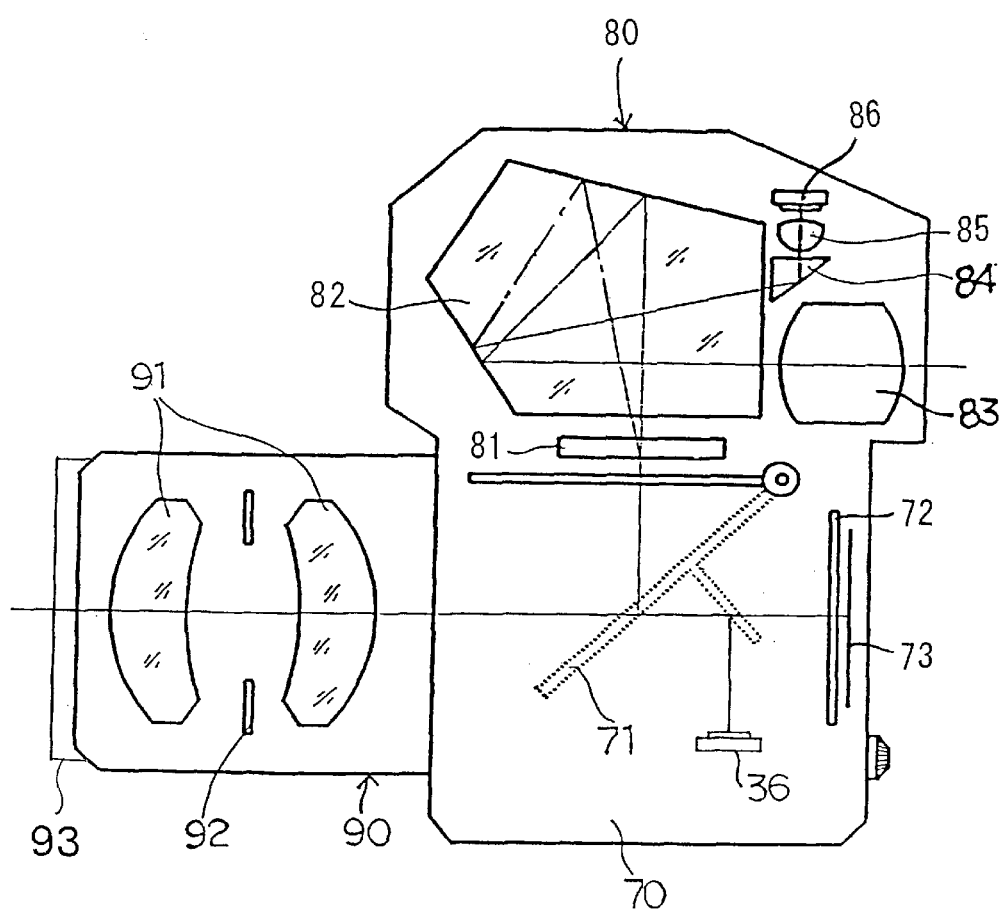
FIG. 1 is a figure showing the structure of one embodiment of a single lens reflex digital still camera.

In the following an embodiment of the present invention will be described with reference to the drawings. As shown in FIG. 1, the single lens reflex digital still camera according to this embodiment comprises a camera main body 70, a viewfinder device 80 detachably fitted to the camera main body 70, and an interchangeable zoom lens 90 detachably fitted to the camera main body 70 which incorporates a lens 91 and an aperture 92. Light from a photographic subject passes through the interchangeable zoom lens 90 and enters the camera main body 70, is directed to a viewfinder device 80 by a quick return mirror 71 which before shutter release is in the position shown by the dotted lines, and, as well as being focused upon a viewfinder matte 81, is also focused upon a focal point detection device 36. The image of the photographic subject upon the viewfinder matte 81 is also conducted to an eyepiece lens 83 by a pentaprism 82. Further, before shutter release, the image of the photographic subject is incident via a prism 84 and a focusing lens 85 upon a white balance sensor 86 which detects the color temperature of the image of the photographic subject. After shutter release the quick return mirror 71 rotates to its position shown by solid lines, and the light from the photographic subject is focused via a shutter 72 upon an image-capturing device 73. A white cap 93 is fitted to the interchangeable zoom lens 90 when setting a white balance adjustment value. Since the white cap 93 is used for illuminating uniform diffused light into the camera main body 70, it is not used during normal photography.

Figure 2:
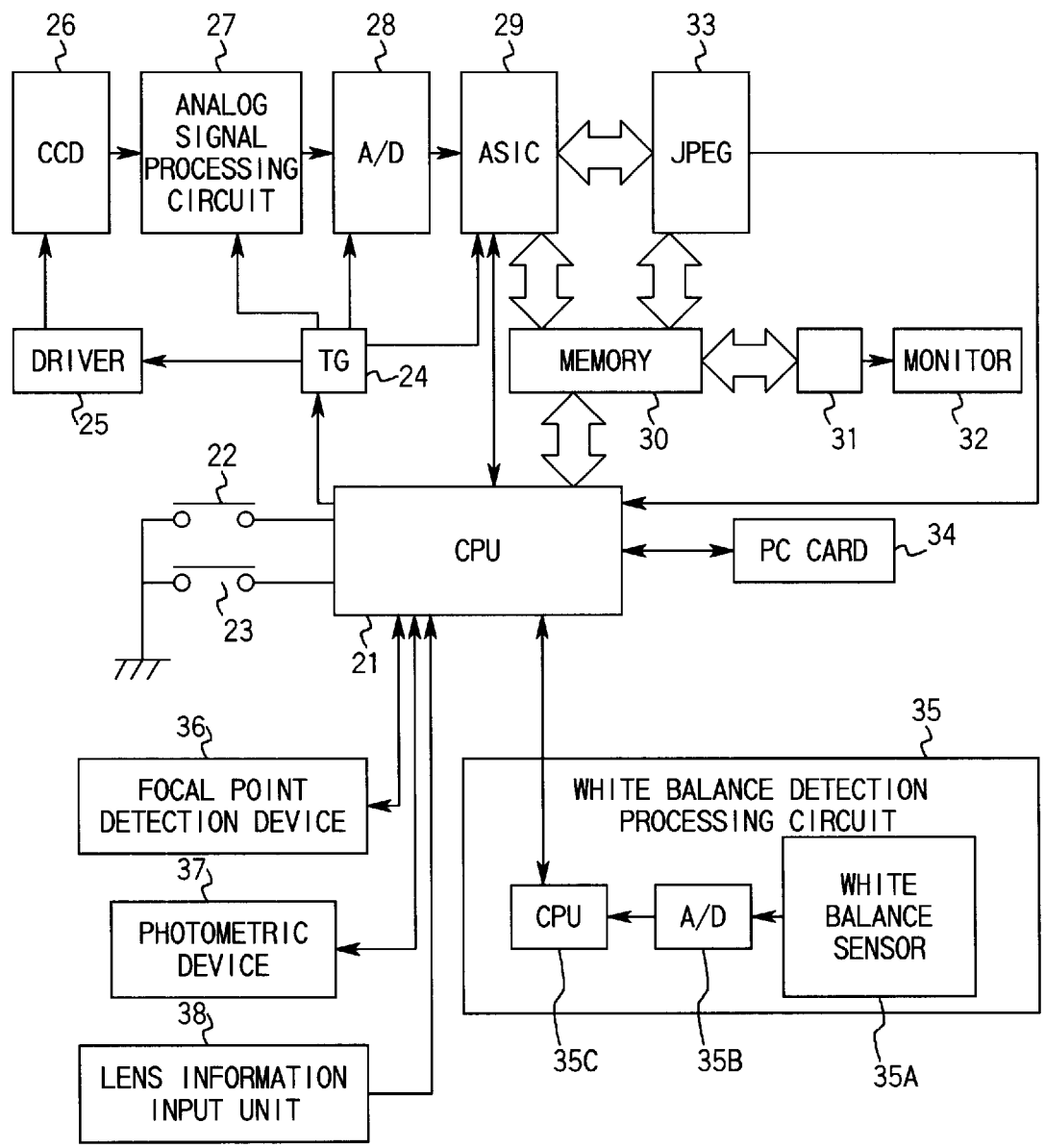
FIG. 2 is a block diagram showing one embodiment of a signal processing system of a single lens reflex digital still camera.

FIG. 2 is a block diagram showing an embodiment of a circuit of a digital camera according to the present invention. A half press signal and a full press signal are respectively input to a CPU 21 from a half press switch 22 and a full press switch 23 which operate together with a shutter release button. When the half press switch 22 is actuated and the half press signal is input, upon a command from the CPU 21 a focal point detection device 36 detects the focal point adjustment state of the interchangeable zoom lens 90, and drives the lens 91 to a focusing position so as to focus light from the photographic subject which is incident into the interchangeable zoom lens 90 into an image upon the image-capturing device 73. Further, a CCD 26 of the image-capturing device 73 is driven and controlled via a timing generator 24 and a driver 25. And the operating timing of an analog processing circuit 27 and an A/D conversion circuit 28 are controlled by the timing generator 24.

When the full press switch 23 is operated to be ON after the half press switch 22 is operated to be ON, the quick return mirror 71 rotates upwards, light from the photographic subject from the interchangeable zoom lens 90 is focused to an image upon the light receiving surface of the CCD 26, and signal electrical charges are accumulated upon the CCD 26 according to the brightness of the image of the photographic subject. The signal electrical charges accumulated upon the CCD 26 are swept out or discharged by a driver 25, and are input to an analog signal processing circuit 27 which comprises an AGC circuit and a CDS circuit and the like. After analog processing such as gain control, noise removal and the like has been executed upon the analog image signal by the analog signal processing circuit 27, it is converted into a digital signal by the A/D conversion circuit 28. The signal which has been converted into digital form is conducted to an image processing circuit 29 which, for example, may be constituted by an ASIC, and therein image preprocessing such as white balance adjustment, outline compensation, and gamma correction is performed.

Further, format processing (image postprocessing) for JPEG compression is performed upon the image data which has been subjected to image preprocessing, and this image data is then temporarily stored in a buffer memory 30.

The image data written into the buffer memory 30 is processed into image data for display by a display image generation circuit 31, and is displayed upon an external monitor 32 such as an LCD or the like as the result of photography. Further, the image data written into the buffer memory 30 is subjected to data compression according to the JPEG method by a compression circuit 33 at a specified ratio, and is recorded upon a recording medium (PC card) 34 such as a flash memory or the like.

Figure 3:
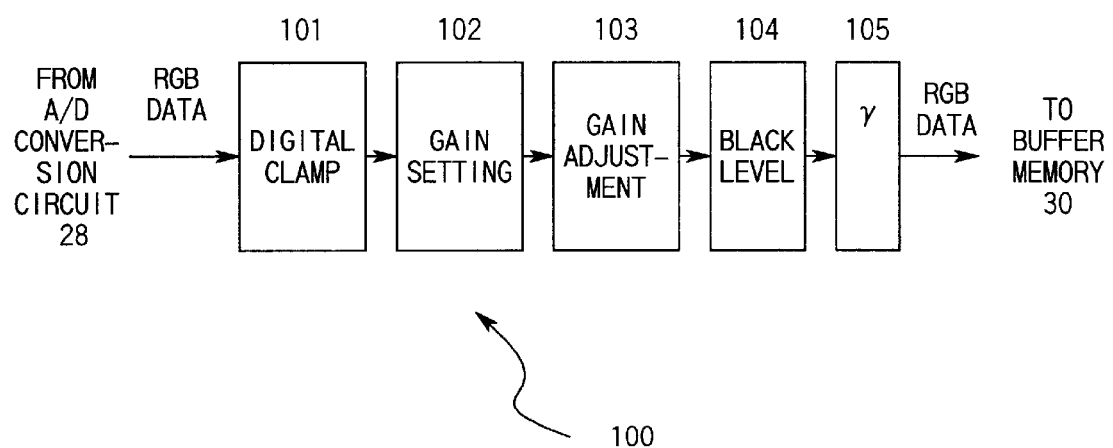
FIG. 3 is a block diagram for explanation of a circuit which performs line processing in the signal processing system shown in FIG. 2.

FIG. 3 is a block diagram showing the details of the image processing circuit 29 for a digital camera which operates as described above. FIG. 3 is a line processing circuit 100 which processes the signals on each line of the image data from the CCD 26, and performs the above described image preprocessing. This line processing circuit 100 is for performing various types of signal processing described hereinafter upon 12 bit R, G, and B signals which are output from the A/D conversion circuit 28, and comprises a digital clamp circuit 101, a gain setting circuit 102, a gain adjustment circuit 103, a black level circuit 104, and a gamma correction circuit 105.

The 12 bit R, G, and B signals which are output from the A/D conversion circuit 28 are input to the digital clamp circuit 101 in the order of the points in each line as to the output of the CCD 26, after the data from pixels which are faulty (whose addresses are specified in advance and are stored in a register) has been compensated. The digital clamp circuit 101, in the order of the points in each line as to the output of the CCD 26, subtracts from each pixel data on that line the weighted average of a plurality of pixel data which are used as optical black.

The gain setting circuit 102 sets the gain for adjustment of the pixel data of each of the colors R, G, and B. For gain adjustment according to this embodiment, beforehand the white cap 93 is fitted onto the zoom lens 90, and diffused light is captured so as to constitute a white standard, and, based upon this image data, presetting processing is performed so as to calculate the gain for adjustment of the pixel data for each color. In the presetting processing, while changing the aperture value and the focal distance of the interchangeable zoom lens 90, the gain for adjustment is calculated, and the calculated gain for adjustment is stored. The gain setting circuit 102 reads out an adjustment value of gain, which was calculated and stored in presetting processing, corresponding to the focal distance and the aperture value of the interchangeable zoom lens 90, and sets it in a gain adjustment circuit 103.

Presetting Processing

Presetting processing is performed by fitting the white cap 93 which is to constitute the white standard to the interchangeable zoom lens 90 to calculate an adjustment value of gain for compensating for white balance adjustment and for reduction of received light intensity in the circumference of the image-capturing surface of the CCD 26. The white balance detection circuit 35 of FIG. 2 includes a white balance sensor 35A (the white balance sensor 86 of FIG. 1) which is a color temperature sensor, an A/D conversion circuit 35B which converts the analog signal from the white balance sensor 35A into a digital signal, and a CPU 35C which produces a white balance adjustment signal based upon the digital color temperature signal. The white balance sensor 35A may, for example, be made up from a plurality of photoelectric conversion elements which are respectively sensitive to red color R, blue color B, and green color G, and it is illuminated by the light image of the entire photographic field. The CPU 35C obtains a gain adjustment value for the R signal and a gain adjustment value for the B signal in the order explained below, based upon the outputs of the plurality of photoelectric conversion elements.

In order to capture an image with the diffused light which is to become the white standard, the white cap 93 is fitted to the interchangeable zoom lens 90, and, from among the image data of the entire region of the photographic field which has been captured, image data is extracted, for example, for a 512×512 region centered upon the area for which the focal point detection device 36 performs focal point detection, and a gain adjustment value R-gain for the R signal and a gain adjustment value B-gain for the B signal are calculated according to the following Equations (1) and (2). At this time, if for example color filters are arranged upon the 512×512 pixel region as shown in FIG. 4, the average values of the R, G, and B signals are calculated with Equations (3) through (5), and, as shown in Equations (1) and (2), the gain adjustment values R-gain and B-gain are calculated from the ratio of the average value G-ave of the G signal and the average value R-ave of the R signal, and the ratio of the average value G-ave of the G signal and the average value B-ave of the B signal.

$$R\text{-gain}=G\text{-ave}/R\text{-ave} \quad (1)$$

$$B\text{-gain}=G\text{-ave}/B\text{-ave} \quad (2)$$

where $$R\text{-ave}=R\text{-sum}/\text{number of R pixels} \quad (3)$$

$$G\text{-ave}=G\text{-sum}/\text{number of G pixels} \quad (4)$$

$$B\text{-ave}=B\text{-sum}/\text{number of B pixels} \quad (5)$$

These gain adjustment values R-gain and B-gain which have been calculated are temporarily stored in a register of the CPU 21 as preset white balance adjustment values, along with the focal point distance and the aperture value of the interchangeable zoom lens 90 which are input from a lens information input section 38. This type of average value method results in determining the average value of the gradation of each R, G, and B signal of the image data, and the adjustment result for white balance (overall white balance) is made satisfactory experimentally. That is to say, the gain adjustment values R-gain and B-gain are calculated so as to bring the average color temperature of the screen close to white, and white balance adjustment is performed based upon these calculated gain adjustment values R-gain and B-gain.

The lens information which is input from the lens information input section 38 relates to the focal point distance (position of the pupil) of the interchangeable zoom lens 90, and this focal point distance of the lens is changed by a signal from a zoom switch not shown in the figures, and the focal point distance of the lens is recognized by a signal from a zoom encoder housed within the lens.

Figure 5:
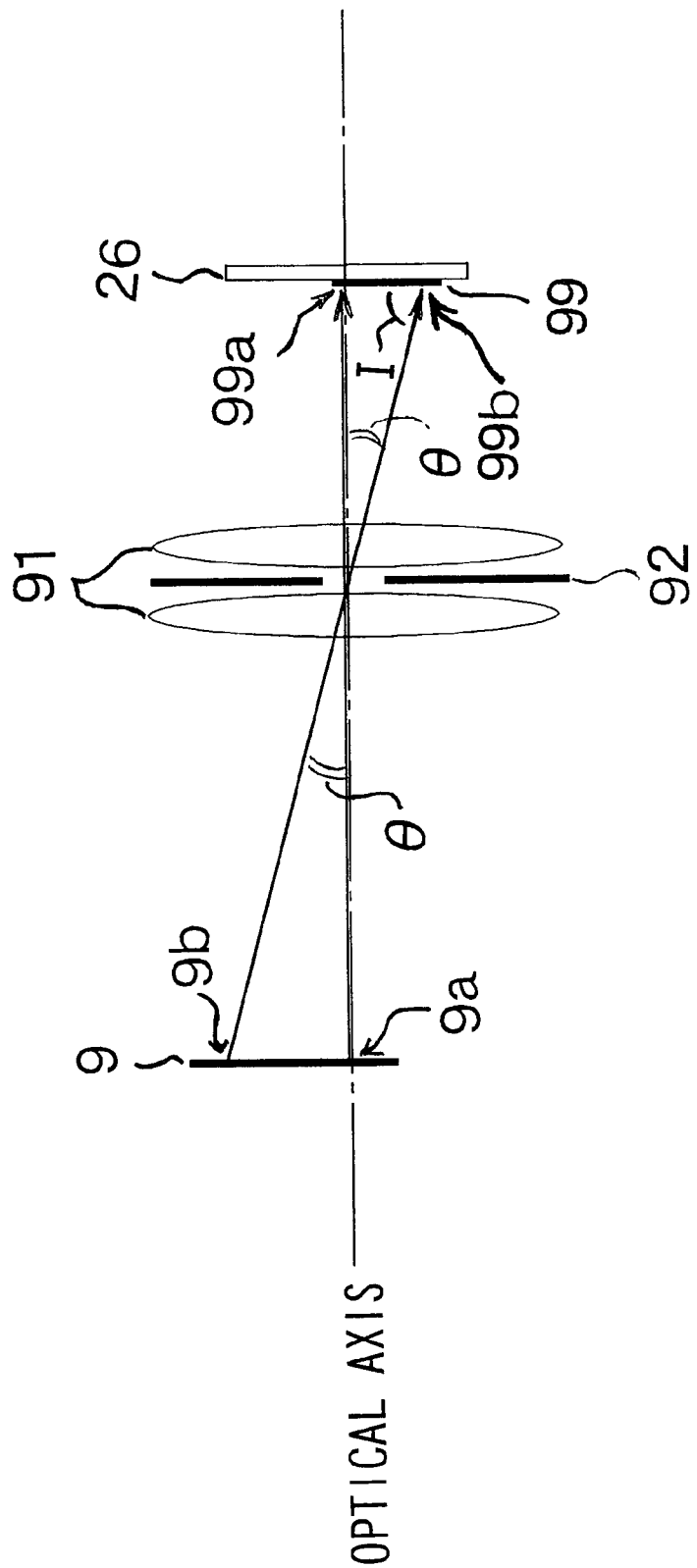
FIG. 5 is a figure for explanation of a cosine fourth power law for a photographic lens.

Next, compensation is performed of the light intensity incident upon the CCD 26, based upon the image data for the entire photographic field for the light diffused by the white cap 93 which has been captured. Generally, with a photographic lens, reduction of the peripheral light intensity occurs according to a so called cosine fourth power law. Referring to FIG. 5 for explanation of the cosine fourth power law of a photographic lens, an image 99 of a photographic subject 9 positioned on the optical axis of a lens 91 is focused upon the CCD 26. The point 9a on the photographic subject 9 is focused to the point 99a on the CCD 26, and the point 9b on the photographic subject 9, which is incident at an angle θ with respect to the optical axis of the lens 91, is focused as the point 99b on the CCD 26. If the brightness of the points 9a and 9b on the photographic subject 9 is the same, the intensity of the incident light at the point 99b on the CCD 26 is reduced to be proportional to $\cos^4\theta$ with respect to the intensity of the incident light at the point 99a. Since the brightness of the entire region of the photographic field is made constant by the operation of the white cap 93 which is fitted to the interchangeable zoom lens 90, in the image data of the image which have been captured, the value output from the pixel on the CCD 26 corresponding to the optical axis of the interchangeable zoom lens 90 constitutes the maximum value, and the output value for a pixel whose pixel position on the CCD 26 is offset from the optical axis is reduced in proportion to the above described cosine fourth power law.

Figure 6:
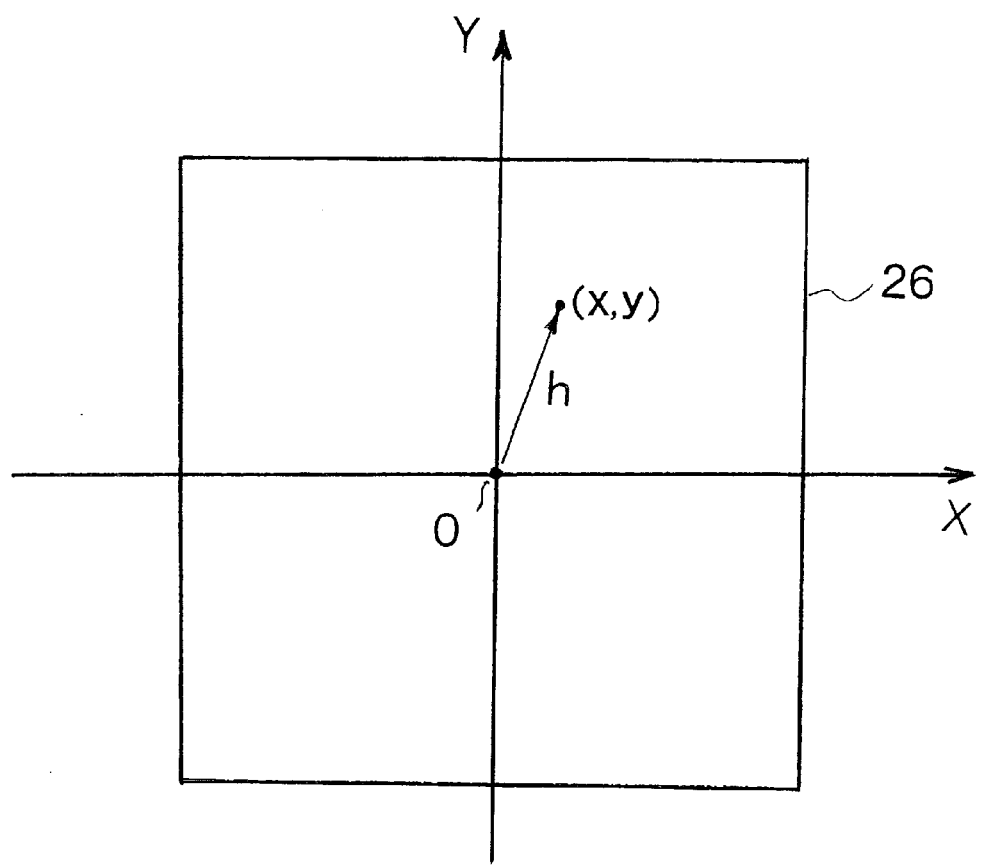
FIG. 6 is a figure showing an X-Y coordinate system giving the positions of the pixels on the CCD for the optical system shown in FIG. 5.

If the light intensity upon the CCD 26 on the optical axis of the lens 90 is termed $L_0$, then the light intensity L upon the CCD 26 is given by the following Equation (6). In the optical system of FIG. 5, when the pixel position on the CCD 26 is expressed in the coordinates XY shown in FIG. 6, if the origin O which is the central point of the CCD 26 is taken as the optical axis, then the image height h is given by Equation (7), and the angle θ is given by Equation (8).

$$L=L_0 \cdot \cos^4\theta \quad (6)$$

$$h=(X^2+y^2)^{1/2} \quad (7)$$

$$\theta=1/(h^2+1)=1/(x^2+y^2+1) \quad (8)$$

Since the angle of incidence I of the light upon the CCD 26 changes as the image height h becomes higher, in case that the transmission loss of the on chip lenses formed on the CCD 26 changes according to the angle of incidence I, the level of the signal output from the CCD 26 changes, since the transmitted light intensity on the CCD 26 is reduced by the on chip lenses in addition to the above described cosine fourth power law. The reduction Lm of light intensity due to the on chip lenses on the CCD 26 is, for example, given by the following Equations (9) through (11).

$$Lm=Ka \cdot h^2+Kb \cdot h+Kc(0 \leq h<d2) \quad (9)$$

$$Lm=Kd \cdot h^3+Ke \cdot h^2+Kf \cdot h+Kg(d1 \leq h<d2) \quad (10)$$

$$Lm=Kh \cdot h+Ki(d2 \leq h) \quad (11)$$

where d1 and d2 are predetermined values of image height, and Ka through Ki are coefficients.

Figure 7:
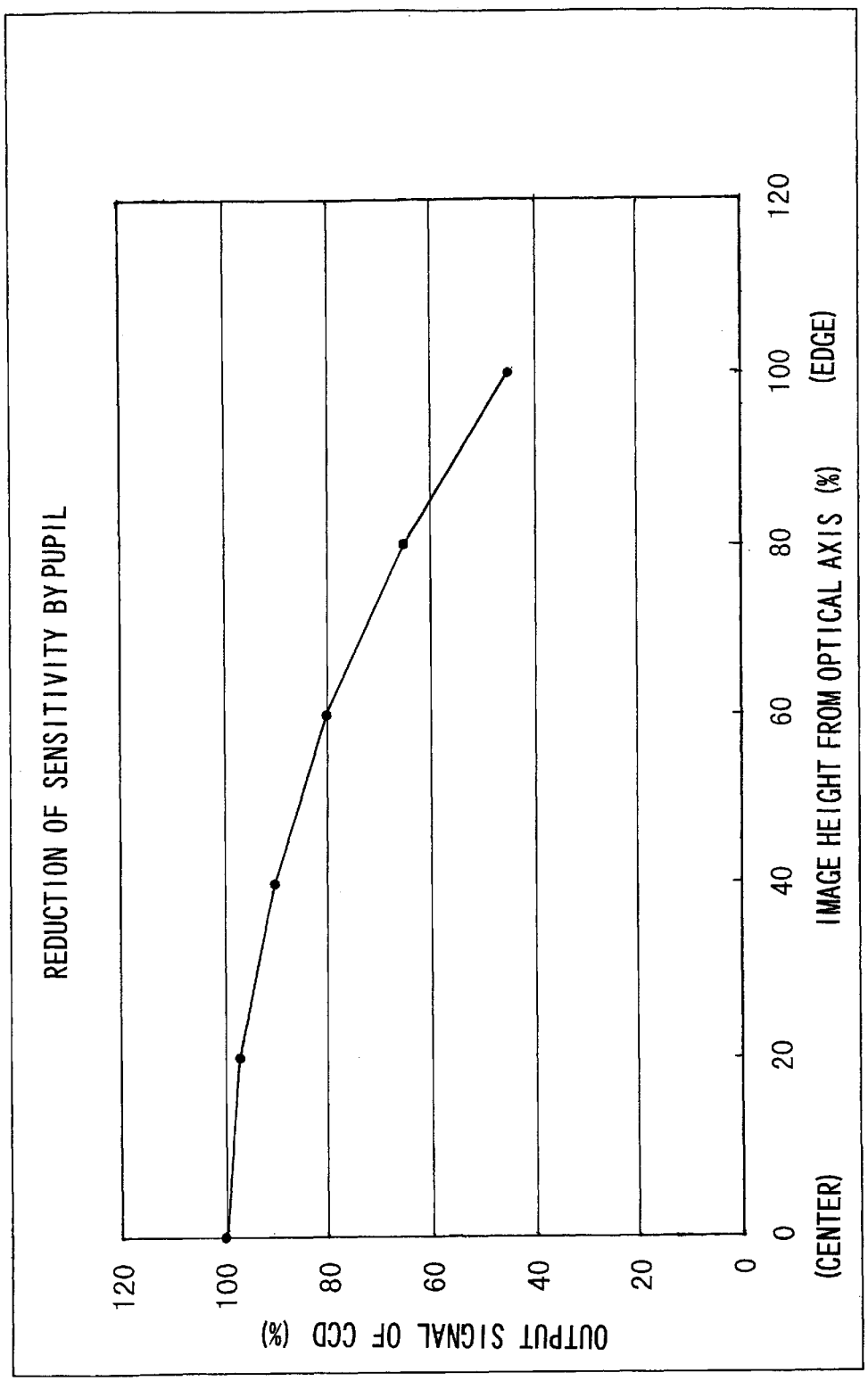
FIG. 7 is a figure showing changes of signal value output from the CCD with respect to image height.

FIG. 7 is a graph showing the relationship between distance (image height) h from the optical axis and the signal for the G color component output from the pixel at that position. Since the reduction of peripheral light intensity on the CCD 26 which occurs as the image height h becomes greater is expressed by the product of Equation (6) and Equations (9) through (11), the above described preset white balance adjustment value is multiplied by the reciprocal of the product of the above Equations (6) and (9) through (11) when setting gain adjustment values for the signals which are output from each of the pixels on the CCD 26. In other words, the image height h is calculated from the coordinates of the position of the pixel which has output the signal and the coordinates of the position of the pixel which corresponds to the optical axis of the lens 91, and a gain adjustment value is determined by obtaining the reduction of the peripheral light intensity is corresponding to this image height h as shown in FIG. 7 and by taking its reciprocal. That is, the gain adjustment value for compensation for the reduction of peripheral light intensity is small for pixel data close to the optical axis, and becomes greater for pixel data further from the optical axis.

The adjustment value for gain, which has been determined as the product of the reciprocal of the product of the above Equations (6) and (9) through (11) and the preset white balance adjustment value, is stored in a register of the CPU 21, along with the focal point distance (the position of the exit pupil) and the aperture value of the interchangeable zoom lens 90. It should be understood that the above Equations (6) and (9) through (11) are calculated for each of the R, G, and B color components output from the pixels of the CCD 26.

Figure 8A:
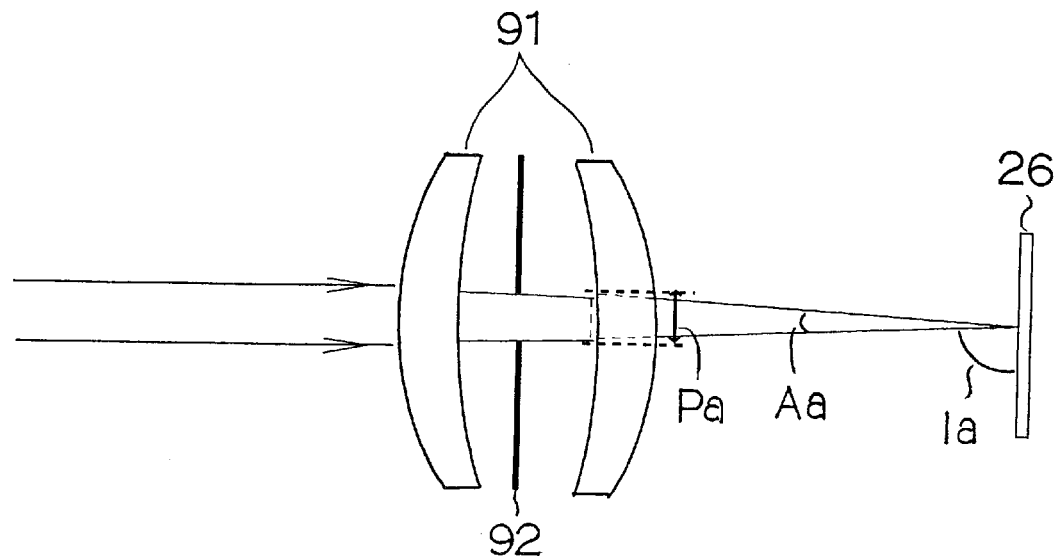
FIGS. 8A and 8B are figures showing the situation when parallel light incident upon the photographic lens falls upon the CCD via an aperture.
Figure 8B:
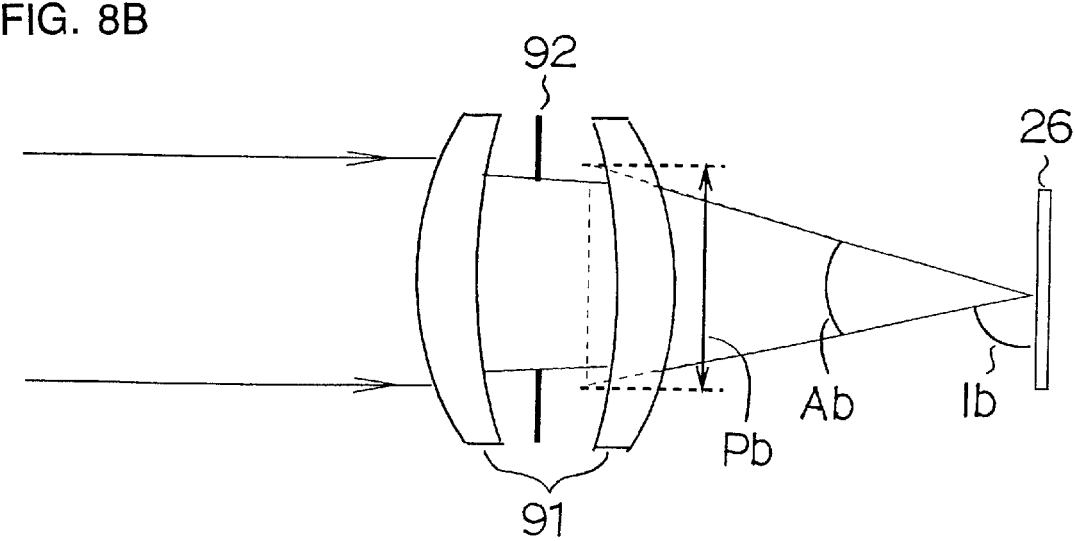

The above described preset white balance and reduction of peripheral light intensity change in the following manner according to the aperture value of the adjustable zoom lens 90 and its focal point distance (exit pupil position). FIGS. 8A and 8B are figures showing the situation when parallel light incident upon the interchangeable zoom lens 90 falls via the aperture 92 upon the CCD 26. As shown in FIG. 8A, with a typical zoom lens 90, the exit pupil Pa becomes smaller as the setting value of the aperture 92 becomes larger and it is closed down, and as the opening angle Aa of the lens 91 becomes narrower. Since at this time the angle Ia of incidence of the light incident upon the CCD 26 hardly changes, the changes in the levels of the R, G, and B color signals output from the CCD 26 are small.

However, as shown in FIG. 8B, when the setting value of the aperture 92 approaches fully open, the exit pupil Pb becomes larger, and the opening angle Ab becomes larger. And the angle of incidence Ib of the light falling upon the CCD 26 changes according to widening of the opening angle Ab. When the transmission loss of the on chip lenses formed on the CCD 26 has a wavelength dependence corresponding to the angle of incidence, or when the characteristics of a color filter formed on the CCD 26 as shown in FIG. 4 vary according to the angle of incidence, the levels of the R, G, and B color signals output from the CCD 26 change individually.

Figure 9:
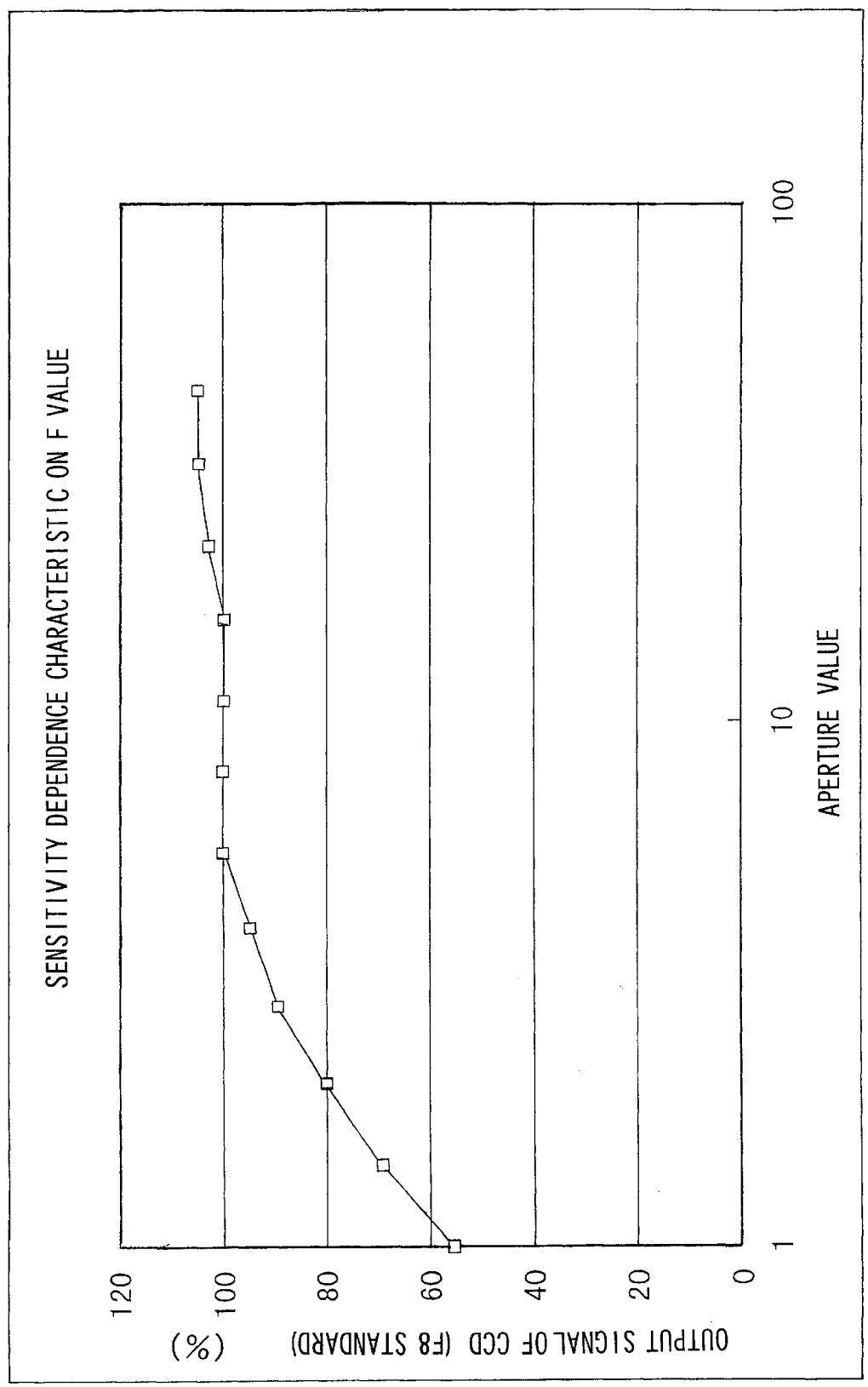
FIG. 9 is a figure showing changes of signal value output from the CCD with respect to aperture value of an interchangeable zoom lens.

FIG. 9 is a graph of sensitivity dependence on aperture value showing an example of change of the value of the G color component signal output from the CCD 26 with respect to the aperture value of the interchangeable zoom lens 90 fitted to the camera main body 70. This data was obtained by measuring the output of the CCD 26 while adjusting the intensity of the light incident upon the interchangeable zoom lens 90, i.e. the brightness of the light source, so that the brightness at the mounting position of the CCD 26 remained constant even though the aperture value of the interchangeable zoom lens 90 changed, and shows the output of the CCD 26 corresponding to, for example, a region taking the area for which focus detection is performed as a center. Since the vertical axis of the FIG. 9 graph takes as standard the value output from the CCD 26 when the aperture value=F8, it will be understood from the graph of FIG. 9 that, due to the above described reasons, the signal value diminishes when the aperture 92 of the interchangeable zoom lens 90 is put to the fully open side.

Figure 10:
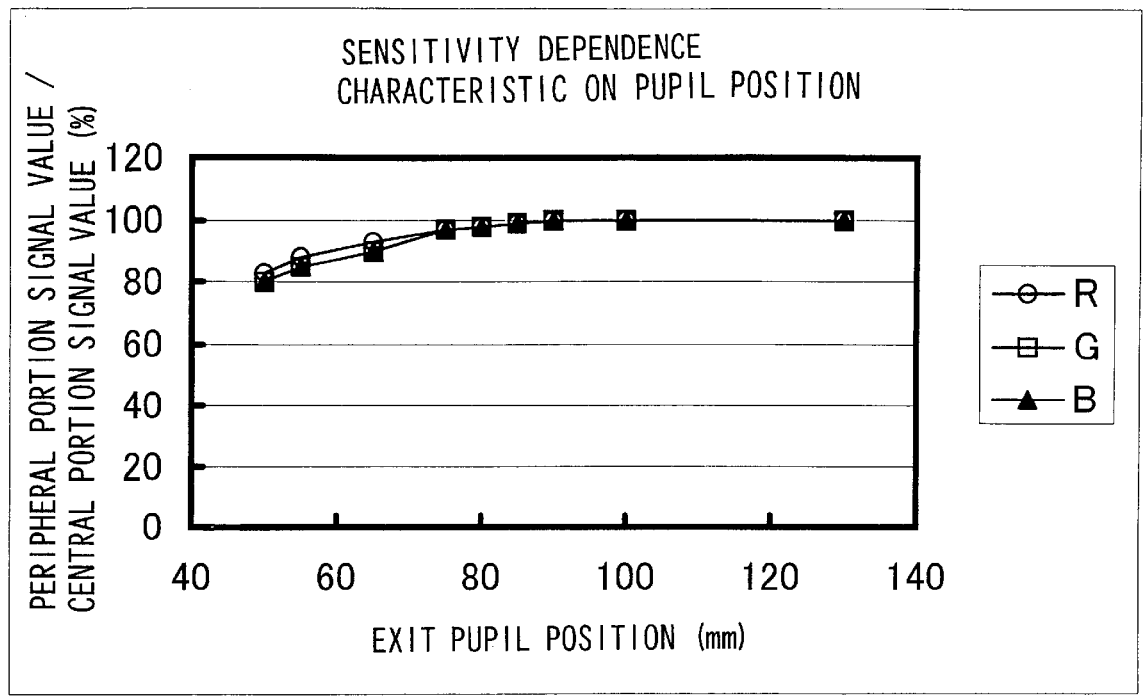
FIG. 10A is a figure showing the ratios between a signal value output from a central portion of the CCD and a signal value output from its peripheral portions, and the position of an exit pupil of the interchangeable zoom lens.
FIG. 10B is a figure showing a numerical array of FIG. 10A.

Further, FIG. 10A is a graph showing an example of change of the signal value output from the CCD 26 with respect to the position of the exit pupil of the interchangeable zoom lens 90 fitted to the camera main body 70, and FIG. 10B shows all the numerical values therein together. This data was obtained by measuring the output of the CCD 26 while adjusting the intensity of the light incident upon the interchangeable zoom lens 90, i.e. the brightness of the light source, so as to keep constant the brightness level at the position at which the CCD 26 was mounted even if the position of the pupil of the interchangeable zoom lens 90 changed, and, for example, shows the output of the CCD 26 corresponding to the region centered upon the area for which focus detection is performed. And the vertical axis in the graph of FIG. 10A shows the ratio between the value of the signal output from the peripheral portion of the CCD 26 and the value of the signal output from the central portion of the CCD 26. According to FIGS. 10A and 10B it will be understood that the position of the exit pupil changes as the focal point distance of the interchangeable zoom lens 90 changes, and the shorter the position of the exit pupil becomes, the lower does the value of the signal output from the peripheral portion of the CCD 26 become. This is due to the same reason as stated above.

As explained above, the adjustment value for the gain set by multiplying together the reciprocal of the product of the above Equations (6) and (9) through (11) and the preset white balance adjustment value of the above Equations (1) through (5) needs to be changed according to the focal point distance and the aperture value of the interchangeable zoom lens 90. In this embodiment, by way of example, three conditions are set for the focal point distance of the interchangeable zoom lens 90: a wide side, a tele side, and an intermediate therebetween. Further, by way of example, two conditions are set for the aperture value of the interchangeable zoom lens 90: a fully opened side and a stopped down side. Adjustment values for the gain which have been calculated for these six combinations of conditions are stored in registers of the CPU 21 along with the focal point distances and the aperture values of the interchangeable zoom lens 90.

It should be understood that the above exemplary explanation related to the case of the optical axis of the lens 91 being in agreement with the origin O which was the center of the CCD 26, but, in the case that photography is performed with the positional relationship between the lens 91 and the center of the CCD 26 having undergone slippage, so called camera movements, for example when the optical axis is positioned at the coordinate $(x_1, y_1)$, it will be sufficient to substitute $(x-x_1)$ for x and $(y-y_1)$ for y in the above Equations (7) through (8).

Moreover, when the gain setting circuit 102 sets the gain adjustment value upon the gain adjustment circuit 103, at the same time compensation is also performed with a predetermined compensation value prepared in advance in order to compensate for unevenness among CCDs 26 one of which is used. In these processes of compensation, the unevenness of sensitivity of the G signal is compensated, and the unevenness of sensitivity ratio to the R signal or the B signal is compensated. Accordingly, the gain adjustment values become: for the R component, Equation (1)×{the reciprocal of the product of Equation (6) and any one of Equations (9) through (11) }×(the unevenness compensation of sensitivity ratio to the G signal); and, for the B component, Equation (2)×{the reciprocal of the product of Equation (6) and any one of Equations (9) through (11)}×(the unevenness compensation of sensitivity ratio to the G signal).

Referring to FIG. 3, when by doing this the gain is set by the gain setting circuit 102, the gain adjustment circuit 103 multiplies the R and B signals by R-gain and B-gain, which are the gain adjustment values set by the gain setting circuit 102. The black level circuit 104 adds to the R, G, and B signals the values determined in advance and stored in the registers of the CPU 21 in the order of the points in each line as to the output of the CCD 26. The gamma correction circuit 105 performs gamma correction in the order of the points in each line as to the output of the CCD 26 by using a gradation lookup table.

Figure 11:
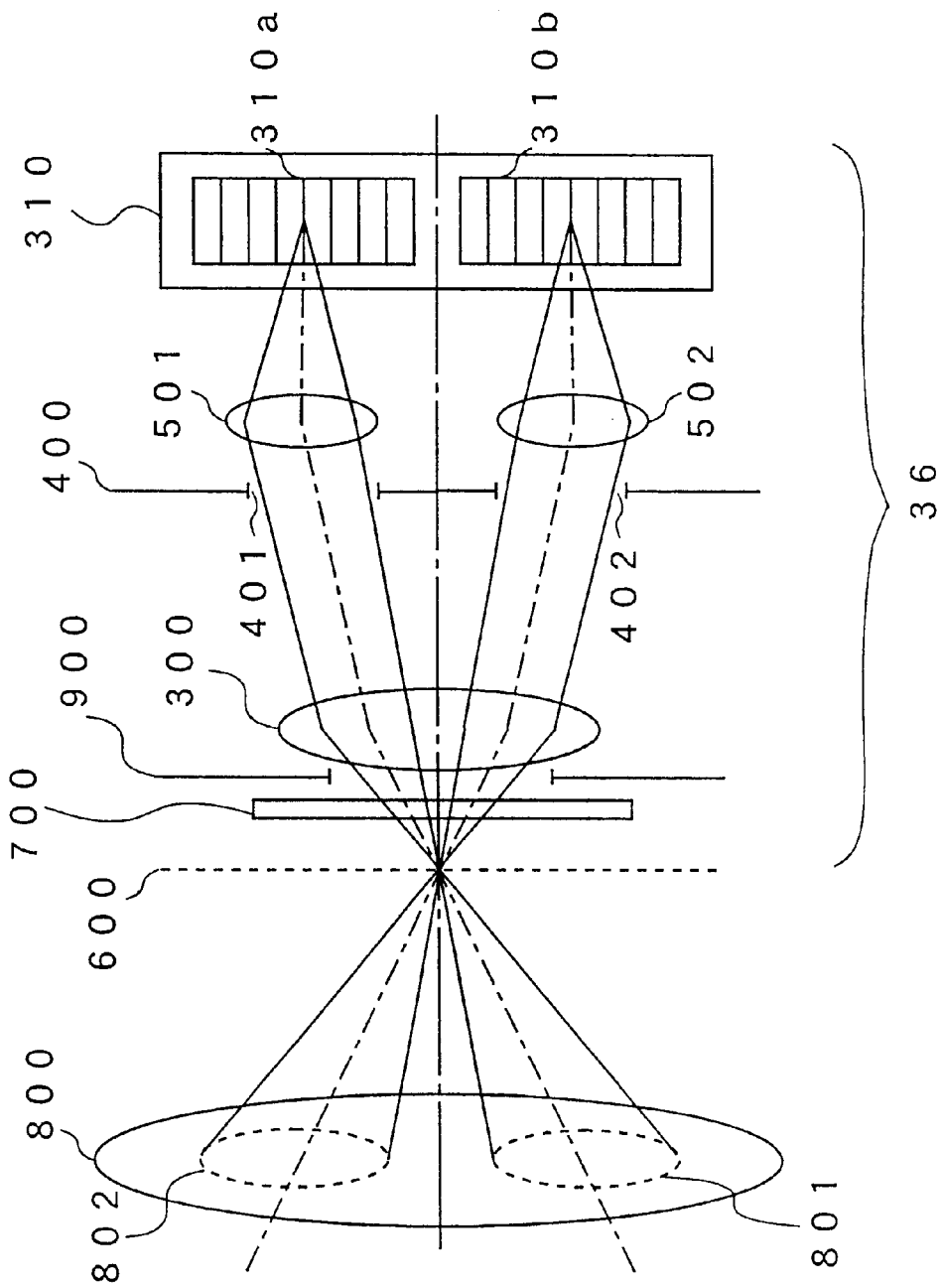
FIG. 11 is a figure for explanation of a focal point detection device.

Next, referring to FIG. 11, the structure of the focal point detection device 36 and the principle of focus detection operation by this focal point detection device 36 will be explained. The focal point detection device 36 comprises an infrared light cut filter 700, a visual field mask 900, a field lens 300, an aperture mask 400, refocusing lenses 501 and 502, and image sensors 310 etc. A region 800 is the exit pupil of the lens 91 (FIG. 1). Further, regions 801 and 802 are regions upon the region 800 where images of aperture portions 401 and 402 which are cut through the aperture mask 400 are reverse projected by the field lens 300. It should be understood that it does not matter whether the position of the infrared light cut filter 700 is on the left side or on the right side of the visual field mask 900. Ray bundles which are incident via the regions 801 and 802, after being focused to a point upon a screen 600 equivalent to the image-capturing device, are focused upon image sensor arrays 310*a* and 310*b* via the infrared light cut filter 700, the visual field mask 900, the field lens 300, the aperture portions 401 and 402, and the refocusing lenses 501 and 502.

The pair of images of the photographic subject focused upon these image sensor arrays 310*a* and 310*b* are mutually brought closer together in a so called pre-focus state in which the lens 91 focuses a clear image of the photographic subject more before the screen 600 equivalent to the image-capturing device (towards the photographic subject), while by contrast they are mutually farther separated in a so called after-focus state in which it focuses a clear image of the photographic subject more after the screen 600 equivalent to the image-capturing device. And when the images of the photographic subject which are focused upon the image sensor arrays 310*a* and 310*b* are at a predetermined interval apart, a clear image of the photographic subject is positioned upon the screen 600 equivalent to the image-capturing device. Accordingly the focal point adjustment state, in other words in which direction and by just how far the position at which a clear image is formed by the lens 91 is separated from the screen 600 equivalent to the image-capturing device, i.e. the amount by which it deviates, is determined by photoelectrically converting this pair of images of the photographic subject into electrical signals by the image sensor arrays 310*a* and 310*b*, and by calculation processing these signals and obtaining the relative distance between the pair of images of the photographic subject. Referring to FIG. 11, the focus detection region corresponds to the superposed portion in the vicinity of the screen 600 equivalent to the image-capturing device to which the image sensor arrays 310*a* and 310*b* are reverse projected by the refocusing lenses 501 and 502. By doing this, the focal point is detected for a focal point detection region within the above described photographic screen.

When the focal point detection device 36 has detected the focal point of the focal point detection region, the lens 91 is driven to a focusing position according to this focal point detection data. It should be understood that, if the focal point detection region is multiple, in the above described presetting processing the gain adjustment values R-gain and B-gain are calculated using 512×512 image data centered upon a region selected by the focal point detection device 36.

Figure 12:
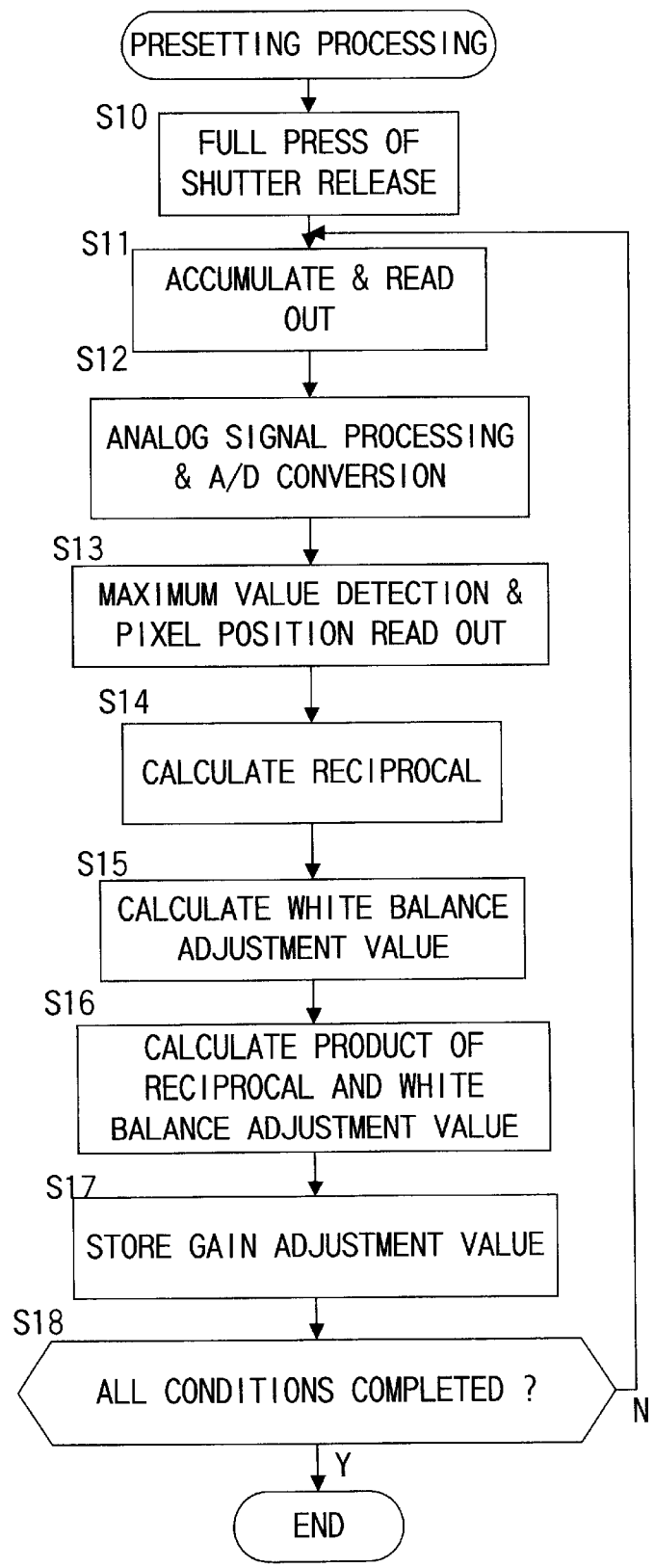
FIG. 12 is a flow chart showing presetting processing.
Figure 13:
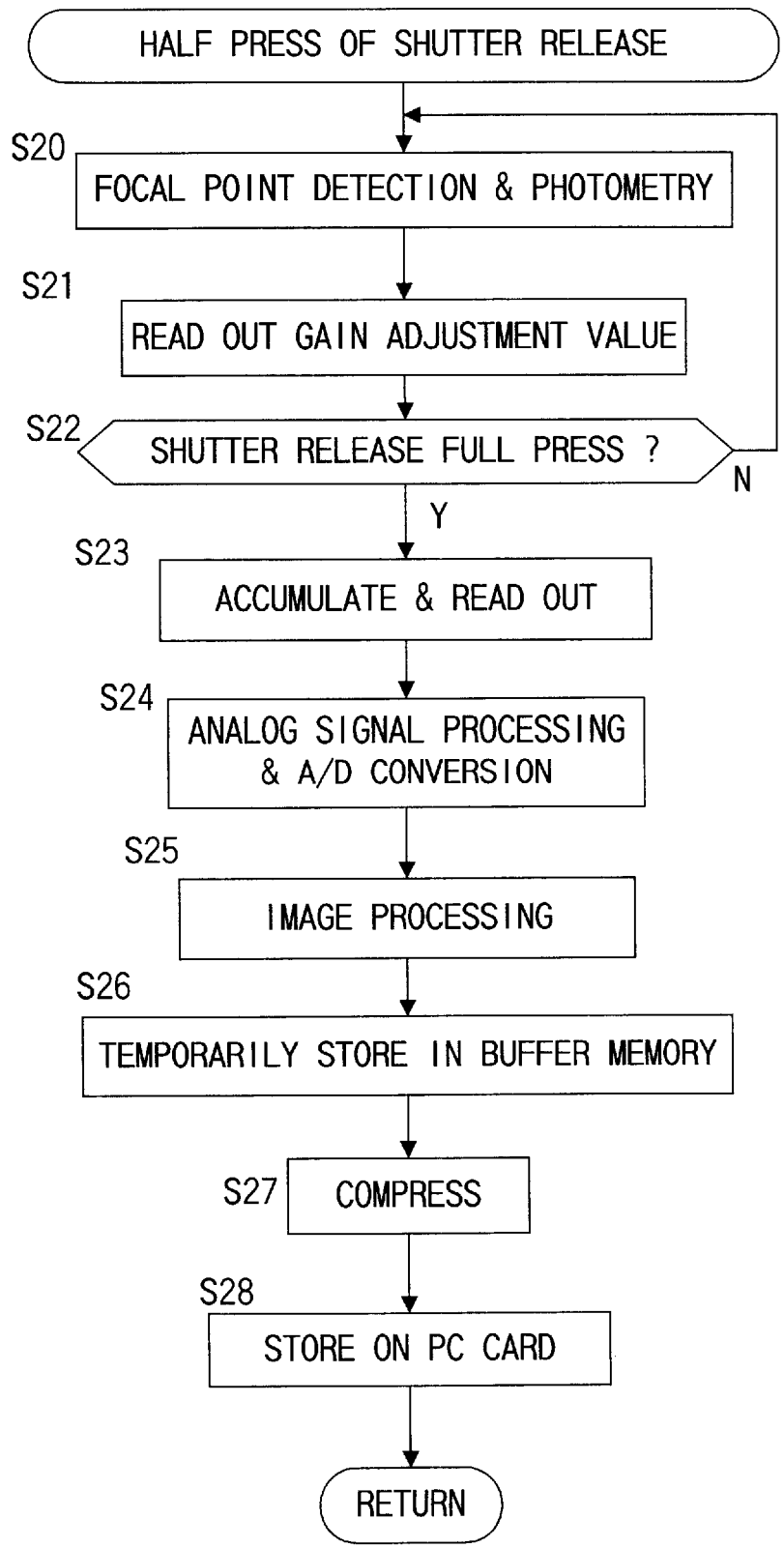
FIG. 13 is a flow chart showing a program initiated by a half press switch.

The operation of the digital still camera constructed in this manner will now be explained. FIG. 12 is a flow chart showing the presetting processing, while FIG. 13 is a flowchart showing a program which is started by the half press switch. In a step S10 of FIG. 12, when the full press switch 23 is operated in the state with the white cap 93 fitted to the interchangeable zoom lens 90, control proceeds to a step S11 and the CCD 26 accumulates received light signals. After the accumulation is completed, the accumulated electrical charges of all the pixels are read out. In a step S12, after the read out image data has been processed by the analog signal processing circuit 27, it is converted into digital image data by the A/D conversion circuit 28, and is stored in the buffer memory 30 via the image processing circuit 29. In a step S13, the data from the image data stored in the buffer memory 30 for which the signal value (brightness) is greatest is detected, and the pixel position ($x_1$, $y_1$) which has output this data is read out. This pixel position ($x_1$, $y_1$) is taken as the position of the optical axis. It should be understood that, if the center position of the CCD 26 agrees with the optical axis, it is possible to take the pixel position at the center of the CCD 26 as the position of the optical axis, and the step S13 may also be curtailed.

In a step S14, while taking the pixel position ($x_1$, $y_1$) as the optical axis, the image height h is obtained for all pixel positions, and the reciprocal of the product of the above Equation (6) and Equations (9) through (11) is calculated. After the preset white balance adjustment values R-gain and B-gain have been calculated in a step S15 by the above Equations (1) through (5), control proceeds to a step S16 in which the product of the above described reciprocal and the preset white balance adjustment values R-gain and B-gain is calculated as the adjustment value of the gain. In a step S17, the adjustment value of the gain is stored in a register of the CPU 21 as the gain adjustment value, along with the focal point distance and the aperture value of the interchangeable zoom lens 90. In a step S18, by changing the focal point distance and the aperture value of the interchangeable zoom lens 90, it is determined whether or not processing has been performed for all of the above described six conditions, and in the case of a negative decision (N) a new condition is set and control is transferred to the step S11. On the other hand, in the case of a positive decision (P) in the step S18, the presetting processing of FIG. 12 is concluded. By the above processing the gain is stored for the six conditions of focal point distance and aperture value.

Referring to FIG. 13, when the half press switch 22 is operated, in a step S20 the brightness of the photographic subject is measured and the exposure is calculated by the photometric device 37, and the focal point adjustment state of the focal point detection region is detected by the focal point detection device 36. In a step S21 the adjustment value of the gain which is stored in a register of the CPU 21 is read out as described above, based upon the focal point distance of the interchangeable zoom lens 90 output from the lens information input section 38 and upon the aperture value obtained by exposure calculation. If no adjustment value of the gain corresponding to the above described focal point distance and aperture value is stored in any register of the CPU 21, a pair of adjustment values of the gain calculated in conditions close to the above described focal point distance and aperture value are read out from among the stored adjustment values of the gain, and an adjustment value of the gain is obtained by interpolation processing from these two adjustment values of the gain.

If in a step S22 it is determined that the full press switch 23 has been operated, then the quick return mirror springs upwards and the photographic sequence is started. In a step S23, each pixel of the CCD 26 accumulates a received light signal, and after accumulation is completed the accumulated electrical charges in all of the pixels are read out in order. In a step S24, after the read out image data has been processed by the analog signal processing circuit 27, it is converted into digital image data by the A/D conversion circuit 28 and is input to the image processing circuit 29. Next control passes to a step S25, in which gain adjustment according to the gain adjustment value described above, γ gradation adjustment correction, conversion to JPEG format, and the like are performed by the image processing circuit 29. When image processing has been completed control passes to a step S26, in which the image data after image processing is temporarily stored in the buffer memory 30. In a step S27, the image data is read out from the buffer memory 30 and is compressed by the JPEG compression circuit 33. In a step S28 the compressed data is stored in the PC card 34.

The characteristics of this embodiment will now be summarized.

(1) Since image capture is performed with the white cap 93 fitted to the interchangeable zoom lens 90 and the optical axis of the interchangeable zoom lens 90 is detected from the pixel position upon the CCD 26 for which the pixel output value is the greatest, and it is arranged that, for all the pixel data output from the CCD 26, the adjustment values of the gain are compensated according to image height from the optical axis, therefore it becomes possible to suppress color loss and color fog caused by the cosine fourth power law of the lens 91 and reduction of the light intensity transmitted by the on chip lenses formed upon the CCD 26, and a high quality image is obtained.

(2) It is arranged that the adjustment values of the gain compensated according to image height h from the optical axis are stored along with the focal point distance and the aperture value of the interchangeable zoom lens 90 when these adjustment values were determined. And, since the adjustment values of the gain according to the focal point distance and the aperture value of the interchangeable zoom lens 90 fitted at the time of photography are read out, and gain adjustment is performed according to the read out adjustment values of the gain, therefore the occurrence of image color loss and color fog is prevented and a high quality image is obtained, even if the light receiving sensitivity of the CCD 26 changes according to focal point distance and aperture value.

In the above explanation, each of the R, G, and B color components output from the CCD 26 was calculated individually in the Equations (6) and (9) through (11) which give the reduction of the peripheral light intensity, and the gain adjustment coefficients for the R signal and the B signal were obtained, but it would also be possible to perform the calculation based only upon the signal values for, for example, the G color component output from the CCD 26, and to calculate simply for the R and B colors by multiplying by specified coefficients to the G color.

Further, in the above explanation, by way of example it was explained that the gains for the R signal and for the B signal were adjusted by taking the G signal as a standard. In other words, as an example, it was explained that, in gain adjustment for the R signal and for the B signal, Equation (1) or Equation (2), and coefficients based upon Equation (6) and anyone of Equations (9) through (11) were multiplied together. However, it would also be acceptable to perform gain adjustment by multiplying together the G signal and coefficients based upon Equation (6) and any one of Equations (9) through (11), as well.

Further, it would also be acceptable to reduce the number of conditions under which presetting processing was performed, within the range in which no influence is exerted upon the intensity of the light received by the CCD 26 and the white balance. In the above explanation, with regard to the conditions of aperture value and focal point distance, presetting processing is performed with two aperture values which are for a fully opened side (minimum aperture) and a stopped down side (maximum aperture), and with three focal point distances which are for a wide side, a tele side, and an intermediate between wide and tele. As a simple method, for example, it will be acceptable to perform presetting processing with one point at which the aperture value=F8 and the focal point distance is 75 mm, and to calculate the adjustment value for the gain for other setting conditions by multiplying the adjustment value of the gain calculated according to the above condition by specified coefficients.

It will also be acceptable to make it selectable whether or not to perform this compensation processing of the gain adjustment value for the cosine fourth power law as explained above and for the reduction in transmitted light intensity due to the on chip lenses formed on the CCD 26.

The above Equations (9)through (11) are separated according to the image height h, but a compatible equation for all image heights h like Equation (12) is also acceptable.

$$Lm = K1 + K2 \cdot h^2 + K3 \cdot h^2 + K4 \cdot h^3 \qquad (12)$$

where K1 through K4 are coefficients, and h is the image height.

Although the above explanation has been made in terms of a digital still camera, it is also possible to store the line processing circuit 100 in the form of software as an image processing program upon a recording medium such as a CD-ROM or a floppy disk or the like, and to use it when processing an image with a personal computer. In this case, the image data which have been captured by the CCD 26 and digitized are stored upon a high capacity recording medium for image data, and when this recording medium is set into the personal computer and the image data have been read in, line processing as described before is performed by the above described image processing program. For example, in FIG. 3, the output data from the black level circuit 104 can be stored as raw data upon the PC card 34, and this PC card 34 can be set into the personal computer so that image processing of the raw data can be performed.

Figure 14:
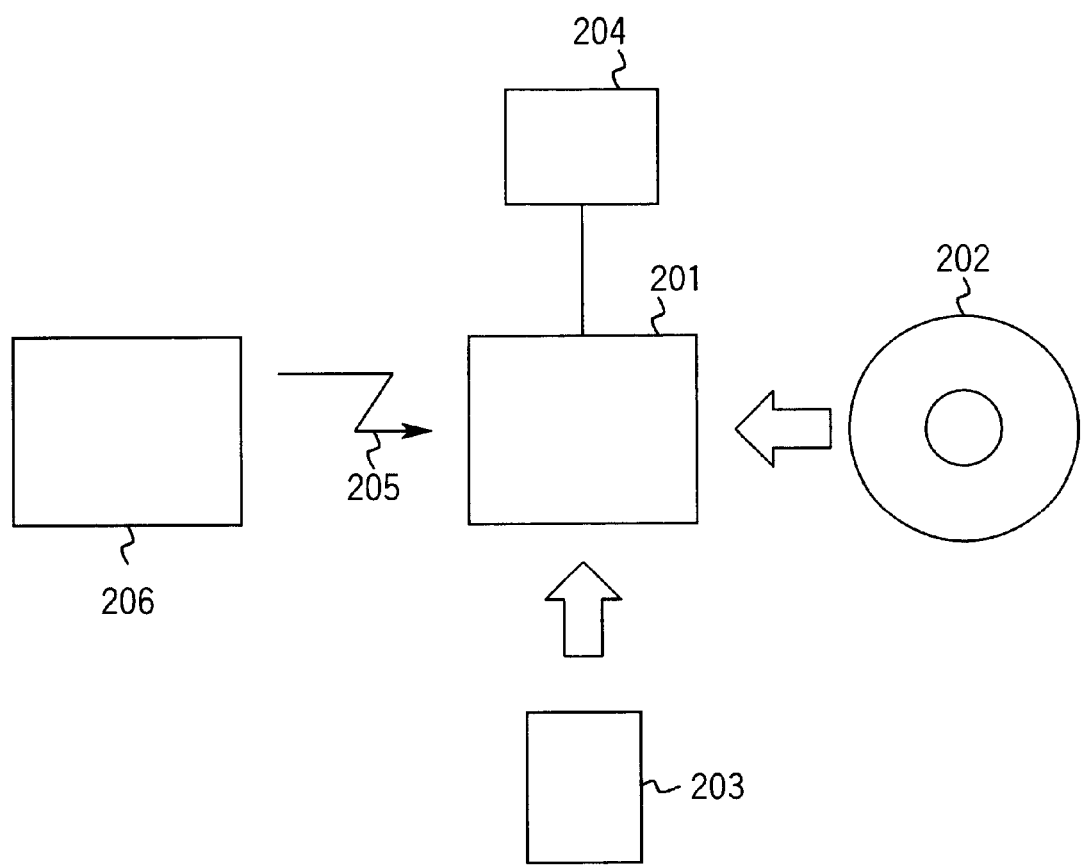
FIG. 14 is a figure showing the structure of processing by a personal computer.

FIG. 14 is a figure showing the processing organization by the above described personal computer. A personal computer 201 comprises a CD-ROM drive device (not shown in the figure), and a CD-ROM on which the above described image processing program is stored is loaded and the program is installed. A PC card 203 upon which the image data is stored is loaded, and it becomes possible to perform processing identical to the above described processing upon the personal computer 201 as well. That is to say, the personal computer 201 works as an image signal processing apparatus. It should be understood that it would also be acceptable for the personal computer 201 and the digital camera 204 to be connected together by a cable, and for the image data to be transmitted. Or the digital camera 204 might also be a CCD camera housed in the personal computer 201. Further, as far as the recording medium upon which the program is provided is concerned, any recording medium such as floppy disk or DVD or the like may be used.

Yet further, it is also possible for the above described image processing program for a personal computer to be provided via a transmission medium such as a communication line or the like such as the internet or the like. That is to say, it is also possible to convert the program into a data signal which is carried by the transmission medium, and thus to transmit it as a signal. The personal computer 201 has a capability of connection to the communication line 205. The computer 206 is a server computer which provides an image processing program, and the image processing program is stored thereon. The communication line 205 is the internet, a communication line for personal computer communication, or a dedicated communication line or the like. The communication line 205 also includes a telephone line or a wireless telephone line for a portable telephone or the like, etc.

As described above, when performing image processing on a personal computer, in the case that the image data which has been stored on the above described recording medium for image data has already been subjected to white balance adjustment, a program is written so as only to perform compensation processing of the gain adjustment value for the cosine fourth power law and for reduction of transmitted light intensity by the on chip lenses formed upon the CCD 26. In this case, the focal point distance and the aperture value of the interchangeable zoom lens 90 are also stored together on the recording medium for the above described image data, and, when performing image processing on the above described personal computer, are used as information for performing compensation processing of the gain adjustment value. On the other hand, in the case that the image data which has been stored on the above described recording medium for image data has not been subjected to white balance adjustment, a program is written so as to perform white balance adjustment processing and compensation processing of the gain adjustment value for the cosine fourth power law and for reduction of transmitted light intensity by the on chip lenses formed upon the CCD 26. In this case, captured data from the CCD 26 and color temperature information for the photographic subject detected by the white balance sensor 35A or an adjustment value for the gain calculated based upon this color temperature information, and moreover the focal point distance and the aperture value of the interchangeable zoom lens 90 as well, are stored together on the recording medium for the image data, and compensation processing is performed for the adjustment value of the gain based upon these data items.

Although in the above explanation the explanation has been made in terms of a single lens reflex digital still camera, the present invention can also be applied to a digital still camera in which the lens cannot be changed over, or to a digital video camera which can take a moving image.

Although in the above explanation the explanation has been made in terms of the case of on chip lenses being formed upon the CCD 26, the present invention can also be applied to the case in which no on chip lenses are formed upon the CCD 26, or to the case in which, instead of on chip lenses, another optical member, for example an optical filter, is provided. If no on chip lenses are formed, only the above Equation (6) is used, and the above Equations (9) through (11) are not used. Further, in the case that another optical member is used, an Equation (corresponding to the above Equations (9) through (11) ) relating to this optical member should be prepared representing the reduction of light intensity due to the image height h and to this optical member, and it will be possible to calculate the reduction of the peripheral light intensity upon the CCD 26 by taking the product with the above Equation (6). Although the explanation has been made, by way of example, in terms of a CCD as the image-capturing device, there are of course acceptable such devices which are not CCDs.

It should be understood that, although in the above explanation the optical axis upon the CCD 26 was detected by fitting the white cap 93 to the interchangeable zoom lens 90 and performing image capture, it would also be acceptable to arrange for the optical axis upon the CCD 26 to be detected by capturing the image of a uniform photographic subject for which the brightness upon the photographic field was uniform, for example a white wall or the like, without using the white cap 93. Further, there is no limitation to white, and a different color could be employed.

What is claimed is:

1. A digital camera comprising:
   an image-capturing device which captures an image of a photographic subject which passes through a photographic lens, and outputs image data;
   a gain adjustment section which performs gain adjustment by multiplying the image data output from said image-capturing device by a predetermined gain;
   a detection section which detects an optical axis of said photographic lens upon said image-capturing device based upon the image data output by the image-capturing device; and
   a gain adjustment coefficient calculation section which calculates a gain adjustment coefficient according to a distance between a position of a part of the image on said image-capturing device and said optical axis, wherein
   said gain adjustment section performs the gain adjustment of the image data corresponding to the position of the part of the image on said image-capturing device using said gain adjustment coefficient.

2. A digital camera according to claim 1, wherein:
   the detection section detects the optical axis by detecting a point which has a maximum value among image data obtained from a photographic subject which has brightness that is constant over an entire photographic region.

3. A digital camera according to claim 1, further comprising:
   a color filter provided upon said image-capturing device, wherein
   said gain adjustment coefficient calculation section calculates a gain adjustment coefficient for each color for the image data which have been captured via said color filter.

4. A digital camera according to claim 1, wherein:
   said gain adjustment coefficient is a coefficient which compensates for reduction of light intensity based upon a cosine fourth power law for said photographic lens.

5. A digital camera according to claim 1, wherein:
   said image-capturing device comprises a plurality of pixels;
   an on chip lens which increases light gathering rate is formed upon each of said plurality of pixels; and
   said gain adjustment coefficient is a coefficient which compensates for reduction of transmitted light intensity due to said on chip lens.

6. A digital camera according to claim 1, wherein:
   said image-capturing device comprises a plurality of pixels;
   an on chip lens which increases light gathering rate is formed upon each of said plurality of pixels; and
   said gain adjustment coefficient is a coefficient which compensates for reduction of light intensity based upon a cosine fourth power law for said photographic lens, and for reduction of transmitted light intensity due to said on chip lens.

7. A digital camera comprising:
   an image-capturing device which captures an image of a photographic subject which passes through a photographic lens, and outputs image data,
   a gain adjustment section which performs gain adjustment by multiplying the image data output from said image-capturing device by a predetermined gain;
   a detection section which detects an optical axis of said photographic lens upon said image-capturing device based upon the image data output by the image-capturing device; and
   a gain adjustment coefficient calculation section which calculates a gain adjustment coefficient according to a distance between a position of a part of the image on said image-capturing device and said optical axis, and lens photographic conditions of said photographic lens including at least one of pupil position and aperture value, wherein said gain adjustment section performs the gain adjustment of the image data corresponding to the position of the part of the image on said image-capturing device using said gain adjustment coefficient.

8. A digital camera according to claim 7, wherein:

the detection section detects the optical axis by detecting a point which has a maximum value among image data obtained from a photographic subject which has brightness that is constant over an entire photographic region.

9. A digital camera according to claim 7, further comprising:

a color filter provided upon said image-capturing device, wherein said gain adjustment coefficient calculation section calculates a gain adjustment coefficient for each color for the image data which have been captured via said color filter.

10. A recording medium on which a program for image signal processing is recorded, said program comprising instructions defining:

a detection process in which an optical axis of a photographic lens located on an image-capturing device is detected based upon image data obtained by the image-capturing device;

a gain adjustment coefficient calculation process in which a gain adjustment coefficient is calculated according to a distance between an image position on the image-capturing device and the optical axis; and a gain adjustment process in which gain adjustment of the image data is performed corresponding to the image position on the image-capturing device using said gain adjustment coefficient.

11. A recording medium according to claim 10, wherein in said gain adjustment coefficient calculation process, the gain adjustment coefficient is calculated according to the distance between the image position on the image-capturing device and the optical axis, and lens photographic conditions of the photographic lens including at least one of pupil position and aperture value.

12. A data signal transmitted via a communication line, the data signal comprising a program for image signal processing, said program comprising instructions defining:

a detection process in which an optical axis of a photographic lens located on an image-capturing device is detected based upon image data obtained by the image-capturing device;

a gain adjustment coefficient calculation process in which a gain adjustment coefficient is calculated according to a distance between an image position on the image-capturing device and the optical axis; and a gain adjustment process in which gain adjustment of the image data is performed corresponding to the image position on the image-capturing device using said gain adjustment coefficient.

13. A data signal according to claim 12, wherein:

in said gain adjustment coefficient calculation process, the gain adjustment coefficient is calculated according to the distance between the image position on the image-capturing device and the optical axis, and lens photographic conditions of the photographic lens including at least one of pupil position and aperture value.

14. An image signal processing apparatus that processes image data output by an image-capturing device, on which a plurality of pixels are arranged in two dimensions, and which captures an image of a photographic subject which has passed through a photographic lens, comprising:

a detection section that detects a pixel corresponding to an optical axis of the photographic lens based upon the image data output by the image-capturing device;

a gain adjustment coefficient calculation section that calculates a coefficient for adjusting a gain for each of said pixels according to a distance between the pixel corresponding to a position of the optical axis of the photographic lens and each of said pixels; and a gain adjustment section which adjusts a gain for the image data of each of said pixels by multiplying a predetermined gain by said coefficient.

15. An image signal processing apparatus according to claim 14, wherein:

the image data output by the image-capturing device includes data related to lens photographic conditions of the photographic lens including at least one of pupil position and aperture value; and said gain adjustment coefficient calculation section calculates the coefficient for adjusting the gain for each of said pixels according to the distance between the pixel corresponding to the position of the optical axis and each of said pixels, and said data related to lens photographic conditions of the photographic lens including at least one of pupil position and aperture value.

* * * * *